Figure 1:
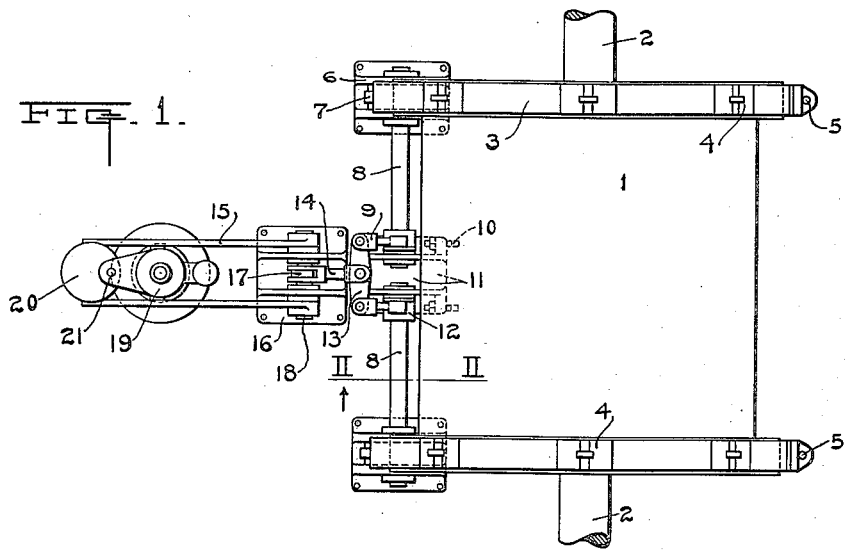

J. W. BROWN.
BRAKE OPERATING MEANS.
APPLICATION FILED FEB. 15, 1911.

1,169,920.  Patented Feb. 1, 1916.

WITNESSES.  J. W. Brown  INVENTOR.
W. H. Lieber
Ella Brickell  BY
ATTORNEY.

UNITED STATES PATENT OFFICE.

JOHN W. BROWN, OF MILWAUKEE, WISCONSIN, ASSIGNOR, BY MESNE ASSIGNMENTS, TO ALLIS-CHALMERS MANUFACTURING COMPANY, A CORPORATION OF DELAWARE.

BRAKE-OPERATING MEANS.

1,169,920.   Specification of Letters Patent.   Patented Feb. 1, 1916.

Application filed February 15, 1911. Serial No. 608,647.

*To all whom it may concern:*

Be it known that I, JOHN W. BROWN, a citizen of the United States, residing at West Allis, Milwaukee, in the county of Milwaukee and State of Wisconsin, have invented a certain new and useful Improvement in Brake-Operating Means, of which the following is a specification.

This invention relates to improvements in the construction of brakes and safety devices for hoisting engines.

The object of the invention is to provide a simple and efficient means for permitting the utilization of a single engine for operating a plurality of brakes in a hoisting engine.

Another object is to provide a safety device which will prevent the brakes from becoming entirely inoperative in case of failure of certain portions of the brake mechanism.

In hoisting engines having a plurality of brakes applied at different portions of a long hoisting drum, it has heretofore been customary to provide a separate operating engine for each brake, thereby providing against complete failure of the brake mechanism through the failure of any one of the brakes. With the present invention, an arrangement of braking elements is provided which permit the utilization of a single engine for operating a plurality of brakes and at the same time providing against total failure of the brakes.

A clear conception of one embodiment of the invention can be obtained by referring to the accompanying drawing in which like reference characters designate the same or similar parts in different views.

Figure 2:
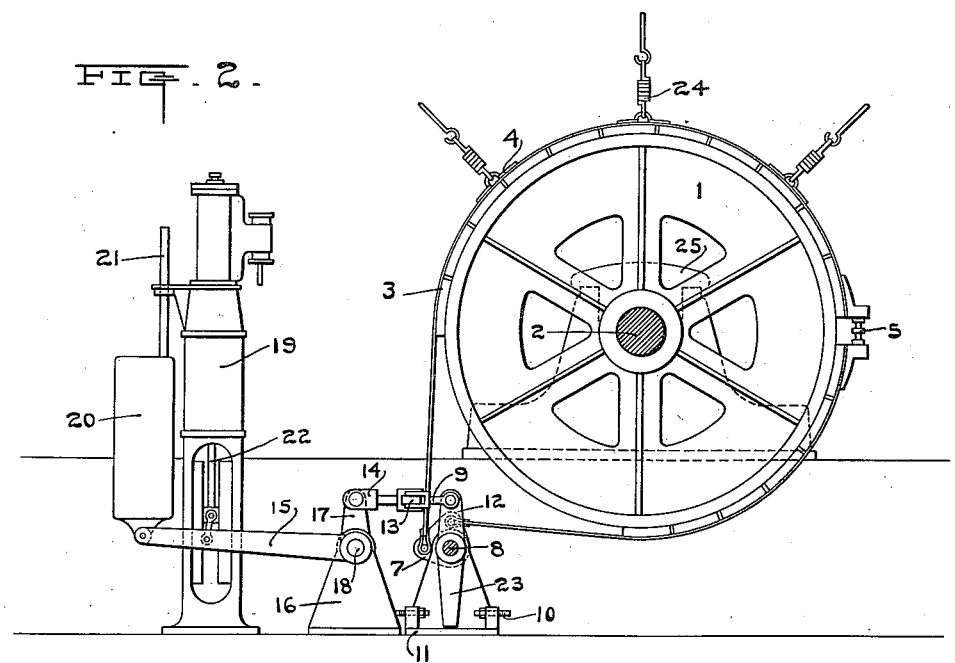

Figure 1 is a plan view of a hoisting engine drum and brake mechanism therefor, showing a double brake operated by a single brake engine. Fig. 2 is an elevation, partly in section, of the device shown in Fig. 1, the section being taken on the line II—II of Fig. 1, looking in the direction of the arrow.

The main drum 1 is mounted upon a horizontal shaft 2 which is supported in suitable end bearings 25 in the usual manner. The ends of the drum 1 are provided with brake surfaces against which the brake straps 3 coact. The brake straps 3 are made adjustable in length by means of the adjusting screws 5 and are normally held out of coaction with the drum 1 by means of a series of springs 24 which are kept under tension by means of stationary hooks fastened to some stationary portion of the engine room. The springs 24 grip the straps 3 through brackets 4 fastened to the exterior surfaces of the straps 3. The brake shafts 8 are coaxial and are mounted in bearings 6, 11, there being one shaft 8 for each brake strap 3. Bell cranks 7 are fixed to the outer ends of the brake shafts 8 and are provided with outwardly projecting pins to which the ends of the brake straps 3 are secured. The inner and adjacent ends of the brake shafts 8 are supported in the bearings 11 and have cranks 12 fixed thereto. The shafts 8, bell cranks 7 and cranks 12 constitute two brake operating levers the operated ends of which move in the same direction to set the brakes. The cranks 12 have downwardly projecting arms 23 formed in one therewith, these arms 23 being adapted to swing between the limiting adjusting bolts 10 which are adjustably mounted in the lower frame of the bearing 11.

Connections 9 are pivotally connected to the upper ends of the cranks 12, the opposite ends of the connections being pivoted to the outer ends of the equalizing link 13. The link 13 has the connection 14 pivoted to the central portion thereof, the opposite free end of the connection 14 being pivoted to the upper end of the crank 17. The crank 17 is fixed to the cross shaft 18 which shaft is mounted in a suitable bearing 16, and has ends which project outwardly beyond the bearing 16.

The single brake engine 19 is of the usual construction and has its piston in up position during the time that the brakes are released. The piston rod 22 of the brake engine 19 is connected to the levers 15 by means of short links or other means for permitting angularity of the levers relative to the rod. The levers 15 are fixed to the outer overhanging ends of the shaft 18 and have a heavy weight 20 mounted upon their free ends. The weight 20 is guided vertically by means of an upwardly projecting rod 21 which passes through a slot formed in the frame of the brake engine 19.

During the operation of the engine and with the brakes in release position, the piston rod 22 of the brake engine 19 is held in its uppermost position by means of steam admitted below the piston. The brake straps 3 during release of the brakes are held out of coaction with the drum 1 by means of the springs 24, such release of the straps being permitted since the bell cranks 7 are in their foremost position.

The setting of the brakes is accomplished by exhausting the steam from below the piston of the common brake engine 19 and permitting the weight 20 to carry the levers 15 downward. The downward motion of the levers 15 causes the crank 17 to exert a pull upon the connection 14 in a direction away from the drum 1. This pull is transmitted through the equalizing link 13, connections 9, cranks 12, shafts 8, and bell cranks 7 to the brake straps 3. With the construction shown, namely, the use of equalizing link 13, the effect of a pull on the connection 14 will cause an equal exertion of pressure on each of the brake straps 3, thus permitting the utilization of one brake engine for operating both brakes. The braking effects on either end of the drum 1 will be equal, the balancing of the braking pressure on the ends of the drum preventing twisting in the drum body.

If for any reason one of the straps 3 should become inoperative, as by breaking thereof, the connection 9 on the side corresponding to the inoperative strap will pull its crank 12 back until the downwardly projecting arm 23 corresponding to its crank 12, strikes the limiting bolt 10. During such positioning of these members the effective braking pull will pass entirely through the equalizing link 13 to the remaining operative brake, thereby avoiding the destruction of the entire braking effect due to the inoperativeness of only one brake strap 3.

If for any reason the steam supply should become exhausted during rotation of the drum 1, the piston of the engine 19 would be automatically lowered by the weight 20, thus setting the brakes and stopping the drum 1. The brake engine could, however, be double acting if so desired, the single acting engine being disclosed as the simpler form.

It should be understood that it is not desired to be limited to the exact details of construction shown and described, for obvious modifications will occur to a person skilled in the art.

It is claimed and desired to secure by Letters Patent:—

1. In a brake, a rotary shaft, a plurality of brakes for said shaft, common operating means for said brakes, an equalizing bar between said operating means and said brakes, and a stop between said operating means and each of said brakes for limiting the movement of the ends of said bar in either direction.

2. In a brake, a rotary shaft, a plurality of brakes for said shaft, a common operating means for said brakes, connecting means between said operating means and said brakes, and a stop adjacent a movable portion of said connecting means to each of said brakes in a position slightly beyond the limiting position of said portion when said brakes are released.

In testimony whereof, I affix my signature in the presence of two witnesses.

JOHN W. BROWN.

Witnesses:
   Chas. L. Byron,
   W. H. Lieber.